(12) United States Patent
Lazier

(10) Patent No.: US 10,649,845 B2
(45) Date of Patent: May 12, 2020

(54) DURABILITY-BASED REDUNDANCY ENCODED DATA STORAGE

(71) Applicant: Amazon Technologies, Inc., Seattle, WA (US)

(72) Inventor: Colin Laird Lazier, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 16 days.

(21) Appl. No.: 15/785,320

(22) Filed: Oct. 16, 2017

(65) Prior Publication Data

US 2018/0101431 A1 Apr. 12, 2018

Related U.S. Application Data

(63) Continuation of application No. 14/792,031, filed on Jul. 6, 2015, now Pat. No. 9,792,179.

(51) Int. Cl.
*G06F 11/00* (2006.01)
*G06F 11/10* (2006.01)

(52) U.S. Cl.
CPC .............................. *G06F 11/1076* (2013.01)

(58) Field of Classification Search
None
See application file for complete search history.

(56) References Cited

U.S. PATENT DOCUMENTS

| 7,778,972 B1* | 8/2010 | Cormie | G06F 3/0607 707/626 |
|---|---|---|---|
| 8,850,013 B2* | 9/2014 | Waldman | G06F 9/5083 370/229 |
| 8,959,067 B1* | 2/2015 | Patiejunas | G06F 16/2228 707/696 |
| 2005/0283657 A1* | 12/2005 | Nishihara | G11C 29/76 714/6.13 |
| 2013/0103729 A1* | 4/2013 | Cooney | G06F 16/188 707/831 |
| 2015/0169716 A1* | 6/2015 | Franklin | G06F 16/27 707/610 |
| 2016/0065498 A1* | 3/2016 | Harper | H04L 47/826 709/223 |

OTHER PUBLICATIONS

Kirschner, J.C., et al., "Grid Encoded Data Storage Systems for Efficient Data Repair," U.S. Appl. No. 14/789,783, filed Jul. 1, 2015.
Lazier, C.L., "Adaptive Data Loss Mitigation for Redundancy Coding Systems," U.S. Appl. No. 14/741,409, filed Jun. 16, 2015.

* cited by examiner

*Primary Examiner* — Daniel F. McMahon
(74) *Attorney, Agent, or Firm* — Davis Wright Tremaine LLP

(57) ABSTRACT

Techniques for making storage of data objects eventually durable using redundancy encoding are described herein. Data objects are stored in a first set of data storage devices with a first durability. After a predetermined length of time, the data objects are converted to data shards and distributed to a second set of data storage devices with a second durability that is distinct from the first durability.

20 Claims, 9 Drawing Sheets

DURABILITY-BASED REDUNDANCY ENCODED DATA STORAGE

CROSS-REFERENCE TO RELATED APPLICATIONS

This application is a continuation of U.S. patent application Ser. No. 14/792,031, filed on Jul. 6, 2015, entitled "EVENTUALLY DURABLE REDUNDANCY ENCODED DATA STORAGE," the content of which is incorporated by reference herein in its entirety.

BACKGROUND

Modern computer systems make extensive use of network computing and network data storage systems. Such use has proliferated in recent years, particularly in distributed or virtualized computer systems where multiple computer systems may share resources when performing operations and tasks associated with the computer systems. Such computer systems frequently utilize distributed data storage in multiple locations to store shared data items so that such data items may be made available to a plurality of consumers. The resources for network computing and network data storage are often provided by computing resource providers who leverage large-scale networks of computers, servers, and storage drives to enable customers to host and execute a variety of applications and web services. The usage of network computing and network data storage allows customers to efficiently and to adaptively satisfy their varying computing needs, whereby the computing and data storage resources that may be required by the customers are added or removed from a large pool provided by a computing resource provider as needed.

The proliferation of network computing and network data storage, as well as the attendant increase in the number of entities dependent on network computing and network data storage, has increased the importance of balancing both data availability and data integrity on such network computing and network data storage systems. For example, data archival systems and services may use various types of error correcting and error tolerance schemes to ensure data integrity at the expense of data availability, leading to a degraded customer experience due to delays in retrieving the data from the data archive.

BRIEF DESCRIPTION OF THE DRAWINGS

Various embodiments in accordance with the present disclosure will be described with reference to the drawings, in which.

DETAILED DESCRIPTION

Figure 1:
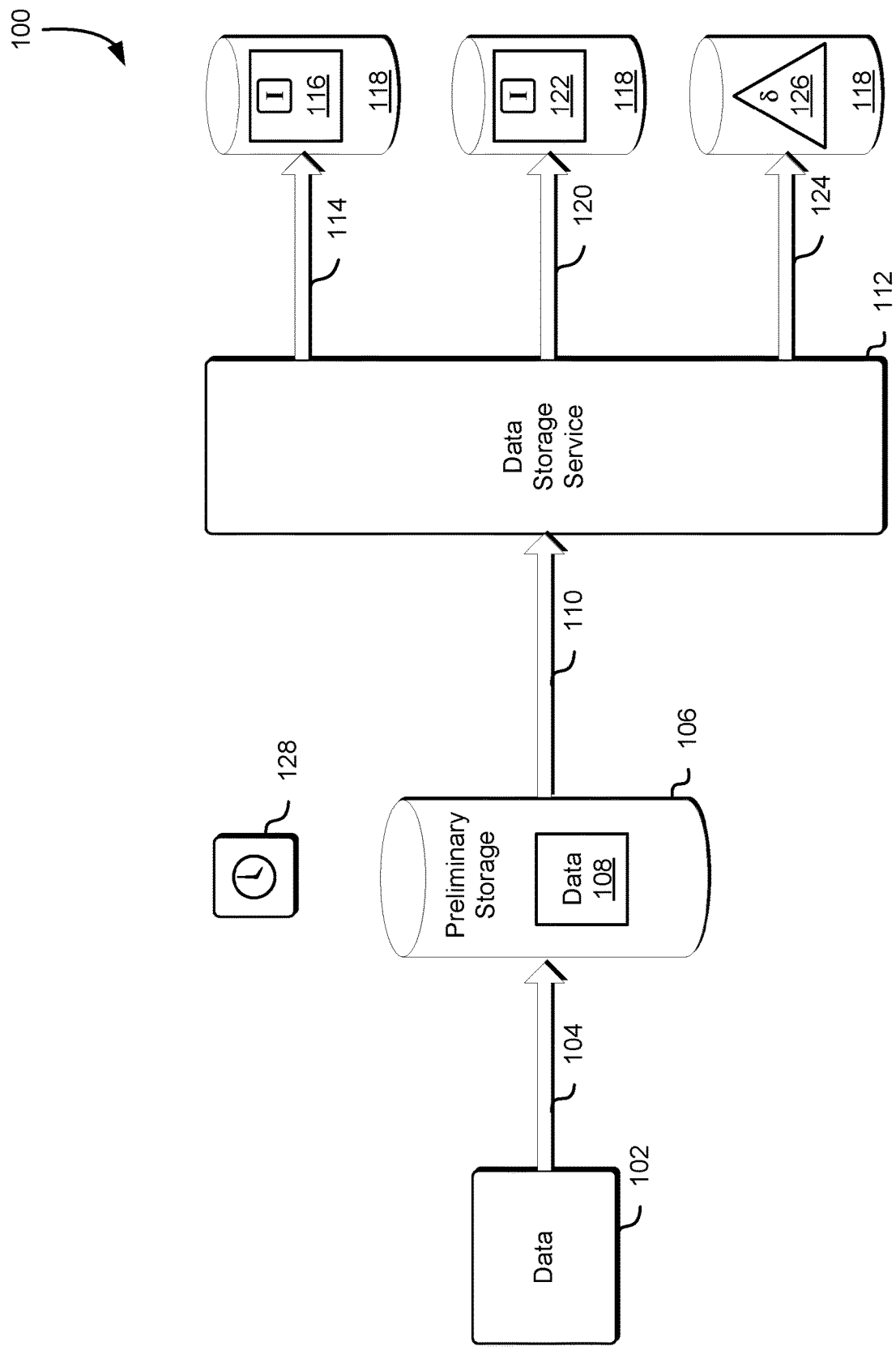
FIG. 1 illustrates an example environment where data stored in preliminary storage can be made eventually durable in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems, and processes for storing data in preliminary storage locations during an initial time period and then migrating that data to durable data storage systems using redundancy encoding techniques after that initial time period has passed. During the initial time period, the data may be stored as a single copy on accessible magnetic media to allow rapid access with little associated storage overhead, but correspondingly little redundancy. After the initial time period has passed and, for example, it has been determined that the data is unlikely to be frequently changing, the data may be moved to durable storage on slower, but more durable media and redundancy encoding to ensure durability of the data at the expense of slower access and increased storage overhead.

Data stored in a data storage system is typically initially volatile. The data items may be frequently changed, added to, and/or deleted by the user or owner of the data. Such data may continue to change rapidly during an initial period (e.g., over the first hour), start to change less rapidly over a next period (e.g., over the first day or two), and become stable thereafter. While such data is volatile, and rapidly changing, it may be inefficient to store it in durable storage using, for example, redundancy encoding techniques such as the techniques described herein. One example reason as to why it may be inefficient to store volatile data in durable storage using redundancy encoding techniques is that such durable storage is typically slow, possibly requiring retrieval from a durable medium such as magnetic tape. Another example reason as to why it may be inefficient to store volatile data in durable storage using redundancy encoding techniques is that there may be an overhead associated with such durable storage both for redundant copies and the computation cost associated with calculating derived redundancy data as described herein. A third example reason as to why it may be inefficient to store volatile data in durable storage using redundancy encoding techniques is that durable storage may be located remotely from the user (i.e., in a remote datacenter) requiring additional network latency to retrieve the volatile data.

As described herein, when volatile data may be rapidly changing, it may be more desirable to store the data in a more readily accessible storage location such as, for example, on a storage device such as a hard drive. Such a storage device may be local to a system or service associated with the data. For example, a virtual machine instance may be configured to allow a user to execute commands that may cause the creation, alteration, and/or deletion of a set of data. The data, while being created, altered, and/or deleted may be stored in a block storage device provided by a block storage service that may be attached to the virtual machine instance and may continue to reside at that location for, for example, the first day or the first two days of the existence of the data.

The length of time that the data may be stored on the block storage device may depend on a number of factors such as, for example, how rapidly the data is changing (i.e., how volatile the data is), the sensitivity of the data, an associated desired reliability, or an associated desired redundancy. As used herein, redundancy of the data may refer to the number of distinct copies of the data that may be retrieved. Highly redundant data may be stored in multiple storage locations or, in the case of some encoding techniques, may be reproducible from multiple storage location.

As an example of reliability, a block storage may have a two percent (0.02) annual failure rate ("AFR"). Over the first hour that the data may be stored on that block storage device there is, on average, a 0.00023 percent chance that the block storage device will fail (i.e., the block storage device may be 99.99977 percent reliable for the first hour). Similarly, the block storage device may be 99.9945 percent reliable for the first day and 99.989 percent reliable through the second day. If it is desired that the data be 99.999 percent reliable (also referred to herein as having "five 9's" of durability), the data should be removed from the block storage device with a two percent AFR before approximately four hours have passed (0.00023 percent chance of data loss per hour). If it is desired that the data be 99.99 percent reliable (also referred to herein as having "four 9's" of durability), the data should be removed from the block storage device with a two percent AFR before two days have passed (0.0055 percent chance of data loss per day). As an example of redundancy, a storage service may store copies of the data in the same storage location, or copies of the data using multiple different storage locations, or copies of the data in multiple geographic locations, or may encode the data in multiple storage locations and also in multiple geographical locations.

As such data generally may become less volatile over the first hour, or the first day, or the first two days, the data can then be moved to a more durable redundant storage system where the desired durability (e.g., four 9's, five 9's, or more) may be achieved by the durability of the data storage medium as well as by one or more redundancy encoding techniques such as those described herein.

In an illustrative example of how such a system may be used, consider a set of data generated as a result of running a daily accounting report for a customer's company. When the report is initially run, a collection of temporary data items related to calculating values for the report may be created. Additionally, the report itself may be generated, which may also be considered a data item. These data items may be stored in a preliminary storage location such as, for example, a block storage device. After the report is initially run, an error may be discovered due to, for example, missing data from a division of the company. In response to this error, additional temporary values may be created and a new and/or changed report may be generated. This data may still be stored in the preliminary storage location. Over the next day, users may access the report and may make changes to parts of it and/or may make changes to the temporary data used to generate the report. However, by the second day it is likely that the report may no longer be changing and that the temporary values may no longer be necessary. Thus, the report may be migrated to durable storage and stored using one or more redundancy encoding techniques to ensure that the report can be reliably stored and retrieved from the durable storage as needed at a later time.

FIG. 1 illustrates an example environment 100 where data stored in preliminary storage can be made eventually durable in accordance with an embodiment. A set of data 102 may be produced and stored 104 in preliminary storage 106. The set of data 102 may be produced by a program, process, application, module, service, or system associated with a computer system as described herein. The set of data 102 may also be produced by a user or customer of the computer system also as described herein. The set of data 102 may include volatile data, which may be added to, changed, and/or deleted from in response to, for example, one or more requests (e.g., application programming interface requests or "API requests") made by the user or customer of the computer system. The set of data may also include non-volatile data (also referred to herein as "static data"), which may be at least partially unchanging as the one or more requests are received.

In an embodiment, the preliminary storage 106 is a data storage volume such as, for example, a magnetic disk drive (e.g., a spinning disk drive or a solid state disk drive), computer system memory, magnetic tape, or some other optical storage device. In another embodiment, the preliminary storage 106 is a virtual and/or shared data storage volume that is mapped to a physical storage volume such as, for example, a disk drive, a solid state disk drive, computer system memory, magnetic tape, or some other optical storage device. As may be contemplated, the types of data storage volumes used for the preliminary storage 106 described herein are illustrative examples and other types of data storage volumes used for the preliminary storage 106 may be considered as within the scope of the present disclosure.

In an embodiment, the preliminary storage 106 is a plurality of storage devices that are used to redundantly store the data 108 using techniques such as, for example, bundle encoding, grid encoding, or replicated storage. For example, the preliminary storage 106 may store the data 108 by distributing the data to a plurality of data shards (e.g., putting a first portion of the data in a first data shard and a second portion of the data in a second data shard) and generating one or more derived shards based on those data shards. In another embodiment, the preliminary storage 106 is one or more storage devices that store redundant copies of the data 108 as received. In yet another embodiment, the preliminary storage 106 uses a combination of the storage techniques described herein by, for example, storing a single copy of the data for a first time period (i.e., thirty minutes), storing multiple copies of the data for a second time period (i.e., one day), using redundant storage techniques such as grid or bundle encoding to store the data for a third time period (i.e., thirty days), and then moving the data to more durable storage using the data storage service 112 as described herein.

The set of data 102 may be stored in the preliminary storage 106 in an unaltered form (i.e., may not be processed, compressed, indexed, or altered prior to storage). The set of data 102 may also be stored in the preliminary storage 106 as, for example, data 108 (also referred to herein as an "identity shard") such as the original data shards described herein. In an embodiment, the set of data 102 stored in the preliminary storage 106 as data 108 is stored without indexing and without any redundancy encoding. In another embodiment, the set of data 102 stored in the preliminary storage 106 as data 108 is stored with null redundancy encoding (i.e., a redundancy encoding that maps the data 108 to itself). The data 108 in preliminary storage may be stored as raw data, or may be bundle-encoded, or may be grid-encoded, or may be stored using some other method.

The preliminary storage 106 may have an associated durability that may be based on, for example, an annual failure rate ("AFR") of the data storage volume or the mapped data storage volume. For a given AFR, it may be assumed that the daily failure rate ("DFR") for the data storage volume or the mapped data storage volume is the AFR divided by three-hundred and sixty-five (i.e., the number of days in a year) and the hourly failure rate ("HFR") of the data storage volume or the mapped data storage volume is the DFR divided by twenty-four (i.e., the number of hours in a day). For example, if a data storage volume or the mapped data storage volume has an AFR of 2 percent, the data storage volume or the mapped data storage volume has a DFR of 0.0055 percent and an HFR of 0.00023 percent.

After a determined time period 128 passes, the set of data 102 and/or the data 108 may be migrated 110 to a data storage service 112 for storage in a durable data storage system. The determined time period may be based on the AFR, the DFR, and/or the HFR of the data storage volume or the mapped data storage volume, may be based on a desired durability of the data, may be based on the volatility of the data (i.e., the amount of changes in the data over the determined time period), or may be based on a combination of these and other such factors. In an embodiment, the volatility of the data (i.e., the amount of changes in the data over the determined time period) can be zero when, for example, the data does not change. Invariant data such as this may be migrated to durable storage more quickly than data that does change frequently. Conversely, data that does change frequently (i.e., highly volatile data) may not be migrated to durable storage at all and may, instead, be migrated to a different storage service as described herein. Accordingly, each data object of the subset of the set of data objects that is selected for migration may be selected based at least in part on the volatility of the data objects. In other words, each data object of the subset of the set of data objects that is selected for migration may be selected based at least in part on a corresponding number of changes made to the data object during a determined length of time.

In an embodiment, data can be migrated from preliminary storage to the data storage service 112 as a result of an event such as, for example, a request by a customer to store the data in the data storage service. Other events may also be used to cause the migration of the data from preliminary storage to the data storage service such as, for example, events generated by a process, module, service, or application associated with the customer or associated with a computing resource service provider. In an illustrative example, a block storage service may maintain data storage in preliminary storage for a running virtual machine instance and, upon termination of the instance, may generate an event to migrate some or all of the data from preliminary storage to durable storage. The triggering event that causes the migration of data from preliminary storage may also be combined with an elapsed time as described above so that, for example, data may be stored in preliminary storage until an event occurs, but the data may also be migrated from preliminary storage if no event occurs prior to the elapsed time. As may be contemplated, the criteria for initiating the migration from preliminary storage described herein are illustrative examples and other such criteria for initiating the migration from preliminary storage may be considered as within the scope of the present disclosure.

As used herein, the durability of a data object may be understood to be an estimate of the probability that the data object will not unintentionally become permanently irretrievable (also referred to herein as "unavailable"). This durability is an estimated probability and is generally expressed as a percentage (e.g., 99.9999 percent). This durability is based on assumptions of probabilities of certain failures (e.g., the AFR of drives used to store the data) and may be based on an average failure rate, a maximum failure rate, a minimum failure rate, a mean failure rate, or some other such failure rate. The durability may be based on a statistical average of the failure over a collection of drives when there are many different drives and/or when there are many different types of drives. The durability may also be based on historical measurements of the failure of drives and/or statistical sampling of the historical measurements of the failure of drives. The durability may also be correlated with the probability that a data object will not unintentionally become unavailable such as, for example, basing the durability on the probability that a data object will unintentionally become unavailable. As may be contemplated, the methods of determining durability of data described herein are merely illustrative examples and other such methods of determining durability of data may be considered as within the scope of the present disclosure.

For example, the determined time period 128 may be calculated based on a length of time that the data remains unchanged and/or is not accessed. In such an example, if the data is unchanged and/or is not accessed over a period of, for example, twelve hours, then the data may be a candidate to be migrated 110 to the data storage service 112. In another example, if the desired durability of the data is set at, for example, four 9's or five 9's, then the data may be scheduled to be migrated 110 to the data storage service 112 when the HFR, the DFR, the AFR, or some other such failure rate would cause an expected durability of the data to fall below the desired durability of the data (i.e., when the aggregated chance of failure causes the expected durability of the data to fall below the desired durability).

When the data is migrated 110 to the data storage service 112, the data storage service 112 may store the data using one or more redundancy encoding techniques such as those described herein. For example, the data storage service 112 may encode the data by producing 114 one or more data shards such as the data shard 116 and may store the one or more data shards on one or more volumes of a set of volumes 118 configured to store the redundancy encoded data as described herein. The data storage service 112 may also copy 120 the data 108 from the preliminary storage 106 to a new data shard 122 (which may include different data than the data in the data shard 116) on a volume that may be one of a set of volumes 118 configured to store the redundancy encoded data as described herein. Depending on the redundancy encoding technique used by the data storage service 112, the data storage service 112 may also produce 124 one or more derived shards 126 and store the derived shards 126 on one or more volumes of a set of volumes 118 configured to store the redundancy encoded data as described herein.

It should be noted that, as used herein, the durability of data and/or data storage may be separate from the redundancy of the data in the data storage. For example, data stored in preliminary storage 106 may be highly durable (i.e., have a very low failure rate) but may not be redundant if, for example, it is stored as a single copy. Conversely, data stored using one or more redundancy encoding techniques such as those described herein and while such data may be less durably stored (i.e., may have fewer "9's" of durability), it may be highly redundant. For example, data stored in a grid may have no fewer than four separate copies of the data (one of the data shard, one from the horizontally-derived shards, one from the vertically-derived shards, and one from the remaining shards). If the grid is geographically distributed into, for example, multiple datacenters, the data may have greater redundancy due to the added tolerance for loss of a complete datacenter.

Figure 2:
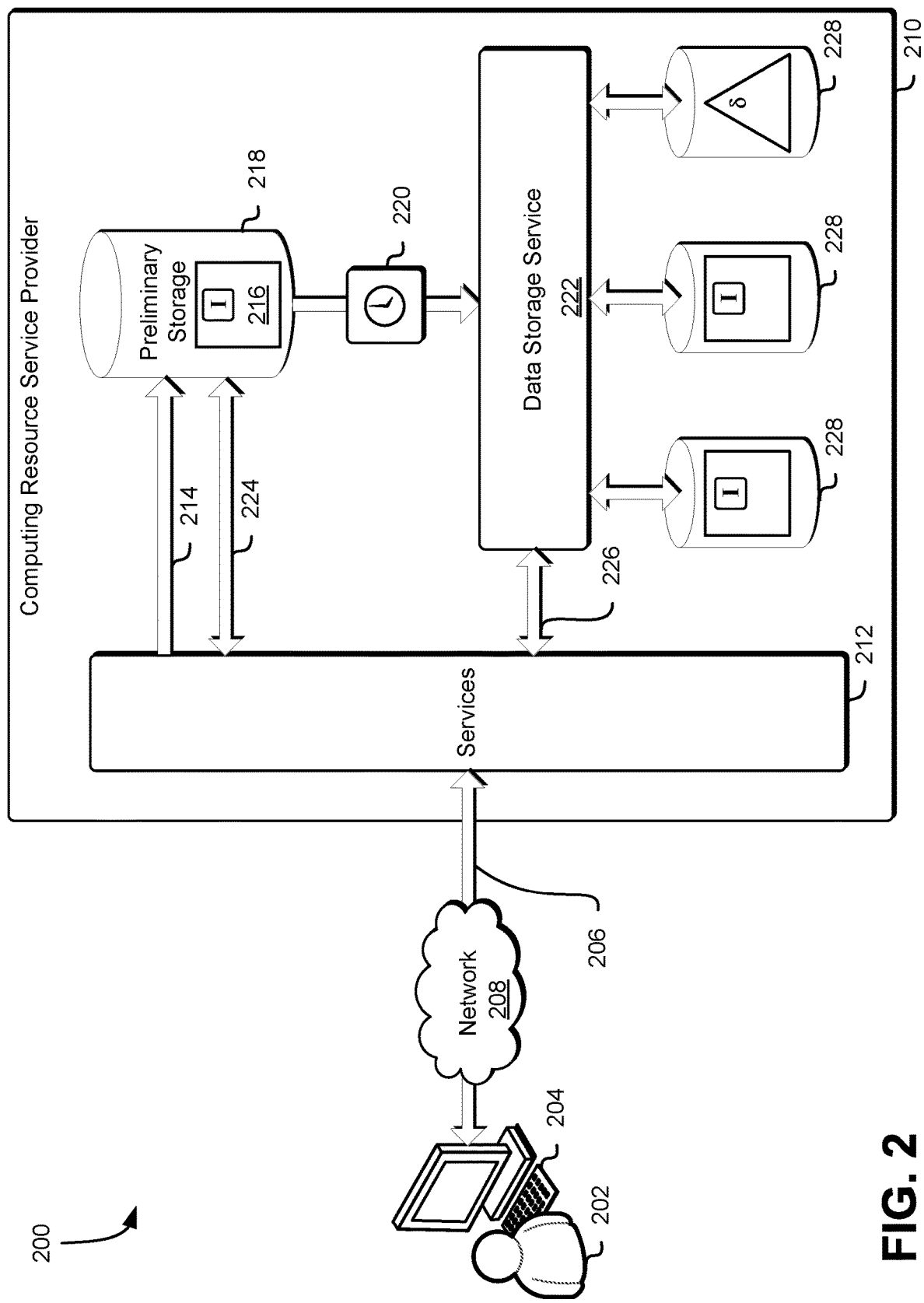
FIG. 2 illustrates an example environment where users and services can use data that is initially stored in preliminary storage and then made eventually durable in accordance with at least one embodiment.

FIG. 2 illustrates an example environment 200 where users and services can use data that is initially stored in preliminary storage and then made eventually durable by storing it in redundant storage systems as described in connection with FIG. 1 and in accordance with at least one embodiment. A user 202 may connect 206 to one or more services 212 through a computer system client device 204. The services 212 may be provided by a computing resource service provider 210. In some embodiments, the computing resource service provider 210 may provide a distributed, virtualized and/or datacenter environment within which one or more applications, processes, services, virtual machines, and/or other such computer system entities may be executed. In some embodiments, the user 202 may be a person, or may be a process running on one or more remote computer systems, or may be some other computer system entity, user, or process.

The command or commands to connect to the computer system instance may originate from an outside computer system and/or server, or may originate from an entity, user, or process on a remote network location, or may originate from an entity, user, or process within the computing resource service provider, or may originate from a user of the computer system client device 204, or may originate as a result of an automatic process or may originate as a result of a combination of these and/or other such origin entities. In some embodiments, the command or commands to initiate the connection 206 to the computing resource service provider 210 may be sent to the services 212, without the intervention of the user 202. The command or commands to initiate the connection 206 to the services 212 may originate from the same origin as the command or commands to connect to the computing resource service provider 210 or may originate from another computer system and/or server, or may originate from a different entity, user, or process on the same or a different remote network location, or may originate from a different entity, user, or process within the computing resource service provider, or may originate from a different user of a computer system client device 204, or may originate as a result of a combination of these and/or other such same and/or different entities.

The user 202 may request connection to the computing resource service provider 210 via one or more connections 206 and, in some embodiments, via one or more networks 208 and/or entities associated therewith, such as servers connected to the network, either directly or indirectly. The computer system client device 204 that may request access to the services 212 may include any device that is capable of connecting with a computer system via a network, including at least servers, laptops, mobile devices such as smartphones or tablets, other smart devices such as smart watches, smart televisions, set-top boxes, video game consoles and other such network-enabled smart devices, distributed computer systems and components thereof, abstracted components such as guest computer systems or virtual machines and/or other types of computing devices and/or components. The network may include, for example, a local network, an internal network, a public network such as the Internet, or other networks such as those listed or described below. The network may also operate in accordance with various protocols such as those listed or described below.

The computing resource service provider 210 may provide access to one or more host machines as well as provide access to services such as virtual machine (VM) instances, automatic scaling groups, or file-based database storage systems as may be operating thereon. The services 212 may connect to or otherwise be associated with one or more storage services such as those described herein (e.g., the data storage service 222). The storage services may be configured to provide data storage for the services 212. In an embodiment, the computing resource service provider 210 may provide direct access to the one or more storage services for use by users and/or customers of the computing resource service provider. The storage services may manage storage of data on one or more block storage devices and/or may manage storage of data on one or more archival storage devices such as, for example, magnetic tapes.

For example, the computing resource service provider 210 may provide a variety of services 212 to the user 202 and the user 202 may communicate with the computing resource service provider 210 via an interface, which may be a web services interface or any other type of interface. The services 212 provided by the computing resource service provider 210 may include, but may not be limited to, a virtual computer system service, a block-level data storage service, a cryptography service, an on-demand data storage service, a notification service, an authentication service, a policy management service, an archival storage service, a durable data storage service such as the data storage service 222, and/or other such services. Each of the services 212 provided by the computing resource service provider 210 may include one or more web service interfaces that enable the user 202 to submit appropriately configured API calls to the various services through web service requests. In addition, each of the services may include one or more service interfaces that enable the services to access each other (e.g., to enable a virtual computer system of the virtual computer system service to store data in or retrieve data from the on-demand data storage service and/or to access one or more block-level data storage devices provided by the block-level data storage service).

The block-level data storage service may comprise one or more computing resources that collectively operate to store data for a user 202 using block-level storage devices (and/or virtualizations thereof). The block-level storage devices of the block-level data storage service may, for example, be operationally attached to virtual computer systems provided by a virtual computer system service to serve as logical units (e.g., virtual drives) for the computer systems. A block-level storage device may enable the persistent storage of data used or generated by a corresponding virtual computer system where the virtual computer system service may be configured to only provide ephemeral data storage.

The computing resource service provider 210 may also include an on-demand data storage service. The on-demand data storage service may be a collection of computing resources configured to synchronously process requests to store and/or access data. The on-demand data storage service may operate using computing resources (e.g., databases) that enable the on-demand data storage service to locate and retrieve data quickly, to allow data to be provided in response to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service may be organized into data objects. The data objects may have arbitrary sizes except, perhaps, for certain constraints on size. Thus, the on-demand data storage service may store numerous data objects of varying sizes. The on-demand data storage service may operate as a key value store that associates data objects with identifiers of the data objects that may be used by the user 202 to retrieve or perform other operations in connection with the data objects stored by the on-demand data storage service.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

The services 212 may produce 214 data 216 that may be stored in the preliminary storage 218 as described above. While the data 216 is stored in the preliminary storage 218, the data may be accessed 224 by the services 212 (e.g., as a result of one or more API requests by the user 202) from the preliminary storage 218. After a determined period has passed and the data is migrated 220 to a data storage service 222 provided by the computing resource service provider 210, the data may be accessed 226 using the data storage service 222. In an embodiment where the data may be stored using a redundancy encoding technique such as those described herein, the data storage service 222 may retrieve the data from any of the data volumes 228 and/or may reconstruct the data using the redundancy encoding techniques. The data volumes 228 may be magnetic tape, may be optical disks, or may be some other such storage media.

The data storage service 222 may store the data 216 in the preliminary storage 218 or may transmit a command that causes a different service (e.g., a block storage service or some other storage service such as those described herein) to store the data 216 in the preliminary storage 218. The data storage service 222 may also cause the data to be migrated 220 from the preliminary storage 218 or may transmit a command that causes a different service to cause the data to be migrated 220 from the preliminary storage 218. The data storage service 222 may also transmit a command or commands to cause a different service to perform other operations associated with making data objects eventually durable including, but not limited to, storing the data objects in the data shards, calculating derived shards, updating bundles, updating grids (i.e., updating horizontal, vertical, and other bundles of multiply bundled data), and/or other such operations.

In an embodiment, a separate service can be configured to monitor the elapsed time associated with the data objects in preliminary storage 218 and, based on a desired durability, cause the data storage service 222 to cause the data to be migrated 220 from the preliminary storage 218 to the durable storage by, for example, transmitting a message to the data storage service. This separate service may operate asynchronously to enforce time limits for all such data stored in preliminary storage.

Figure 3:
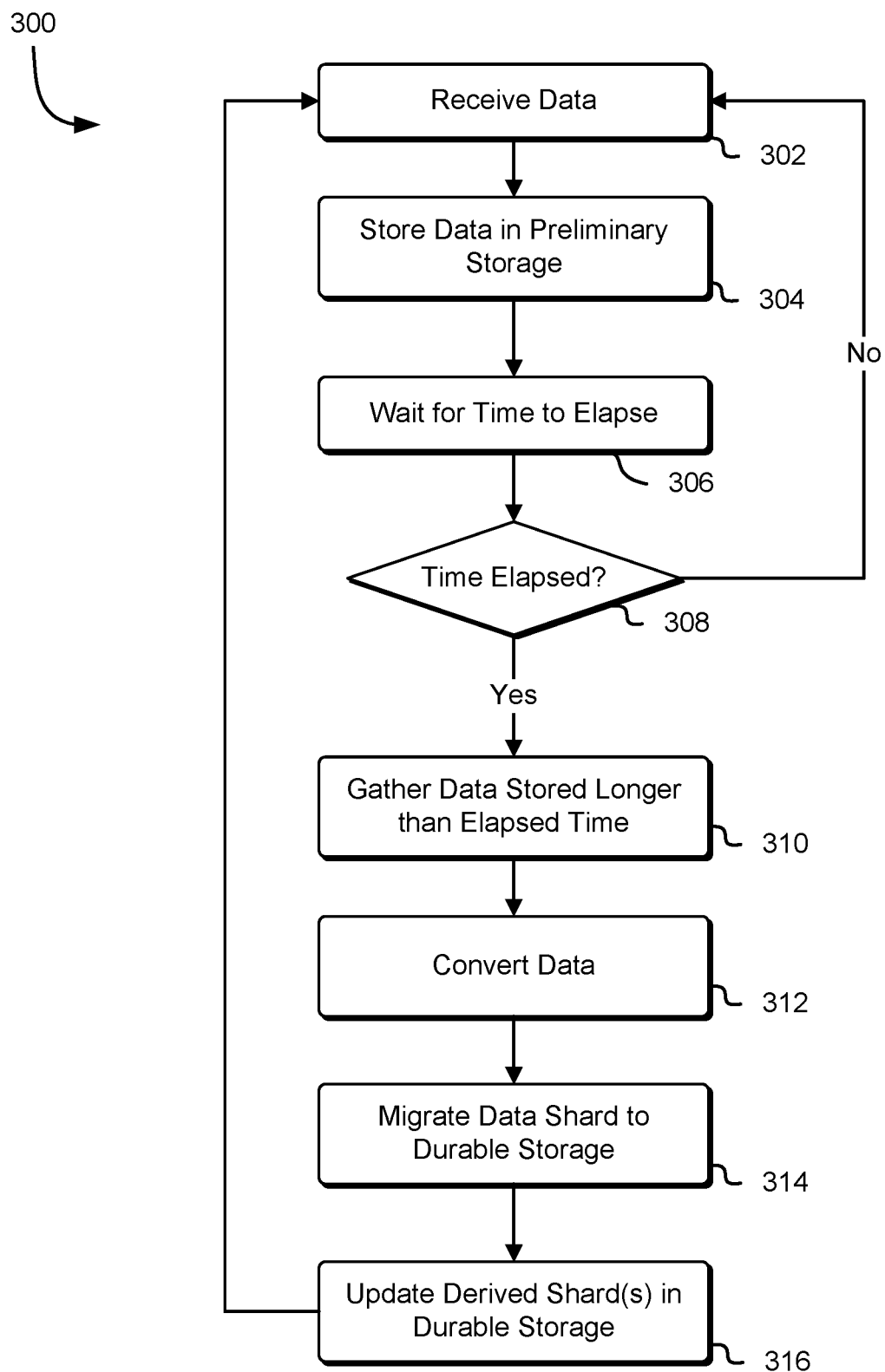
FIG. 3 illustrates an example process for making data stored in preliminary storage eventually durable in accordance with at least one embodiment.

FIG. 3 illustrates an example process 300 for making data stored in preliminary storage eventually durable as described in connection with FIG. 1 and in accordance with an embodiment. A data storage service such as the data storage service 112 described in connection with FIG. 1 may perform the example process 300 illustrated in FIG. 3. A data storage service may first receive data 302 and may store the data in preliminary storage 304. In an embodiment, the data 302 is processed before being stored in preliminary storage to, for example, aggregate the data 302 for storage in the preliminary storage 304. In another embodiment, the data storage service may convert the data to an identity shard as described herein before storing the data in the preliminary storage 304.

When the data has been stored in preliminary storage, the data storage may then wait for a determined time period associated with the data to elapse 306. As described above, this determined time period may be based on the volatility of the data, the desired durability of the data, the projected failure rates of the storage volume, or other factors. After the time has elapsed 308, the data storage service may gather the data that has been in preliminary storage more than the elapsed time 310, convert the data 312, and migrate the converted data into durable storage 314 such as, for example, redundancy encoded data storage. When m the data into durable storage, the data storage service may also update one or more derived storage shards 316 in the durable storage based on the redundancy encoding used for the redundancy encoded data storage.

The operations to convert the data 312 may include packing the data, identifying the data as a candidate for migration to durable storage, or other operations. For example, the data may be packed by compressing it and/or by identifying gaps in the data where data has been removed or where the data is too volatile for migration to durable storage and removing those gaps. Identifying data as a candidate for migration to durable storage may include changing metadata associated with the data (e.g., a data identifier) so that it may be gathered and moved to durable storage.

The process of migrating the data into durable storage 314 may not involve any movement of the data. For example, data may be stored in preliminary storage and may then be converted as described above into an identity shard or a data shard in preliminary storage. The process of migrating the data into durable storage 314 may then calculate a derived shard based on the identity shard or data shard in preliminary storage and may store the derived shard without moving the data shard or identity shard from preliminary storage.

Figure 4:
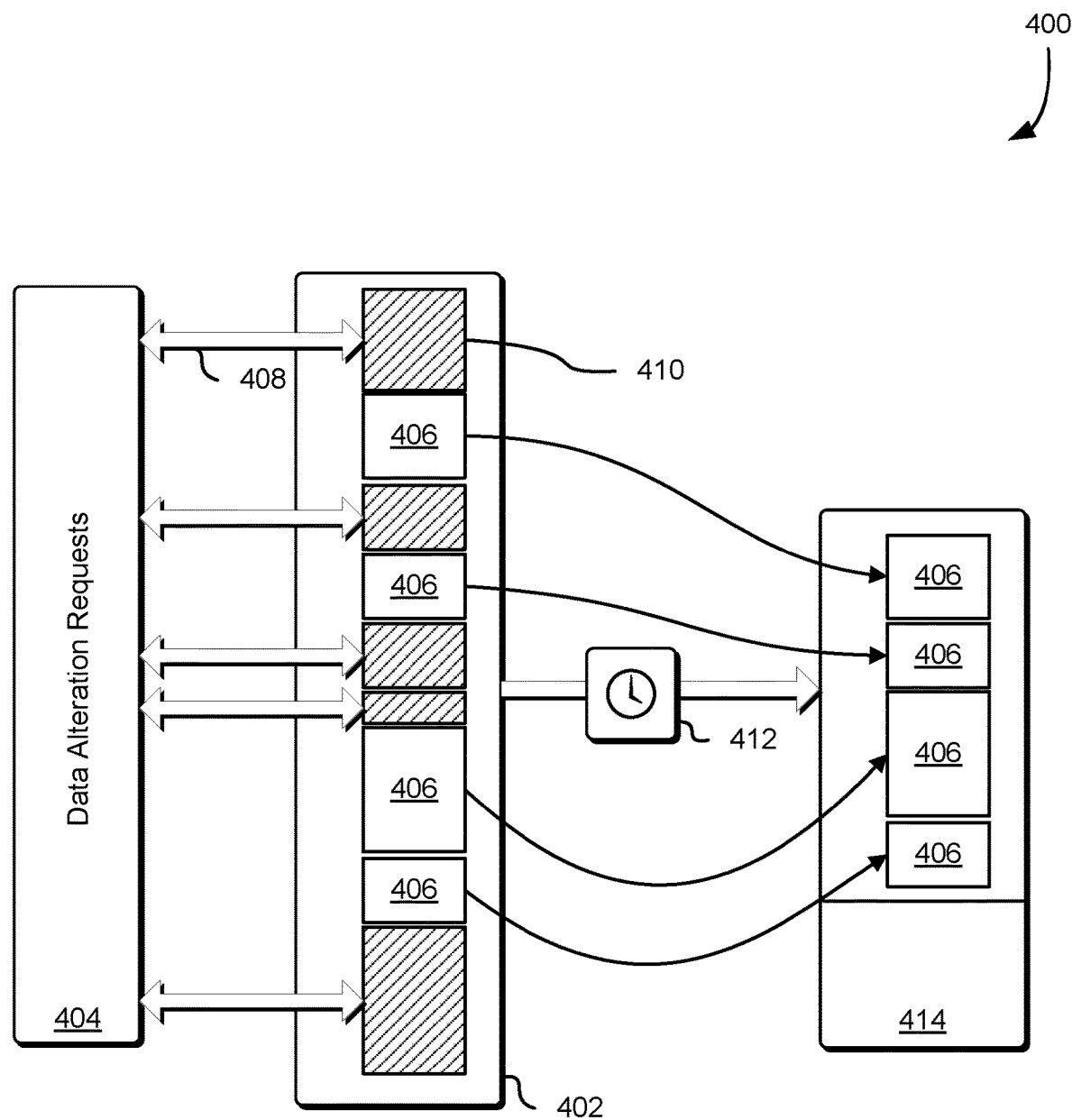
FIG. 4 illustrates an example diagram where a subset of data in preliminary storage can be migrated to durable storage in accordance with at least one embodiment.

FIG. 4 illustrates an example diagram 400 where a subset of data in preliminary storage can be migrated to durable storage as described in connection with FIG. 1 and in accordance with an embodiment. One or more data alteration requests 404 (e.g., API requests) associated with data stored in preliminary storage 402 may be generated by, for example, a service of a computing resource service provider as previously described. The data alteration requests 404 may alter 408 some of the data stored in preliminary storage 402. The altered data 410 (shown as shaded data sections in the example diagram 400 of FIG. 4) may have data added, may have data removed, or may have data changed.

In an embodiment, when the determined time period has expired and the data stored in preliminary storage 402 is migrated 412 to durable storage as previously, only those parts of the data stored in preliminary storage 402 that were not altered by the data alteration requests 404 will be migrated to durable storage 414. In such an embodiment, the altered data 410 may be migrated to durable storage 414 at a later time after, for example, an additional time period has elapsed, or may be migrated to a different identity shard in durable storage, or may not ever be migrated to durable storage. As described herein, the durable storage 414 and the preliminary storage 402 may be the same storage location and/or device. In an embodiment where the altered data 410 is not migrated to durable storage, the altered data 410 may be moved to an intermediate storage location with, for example, both high availability and some durability (e.g., some other redundant storage system).

Figure 5:
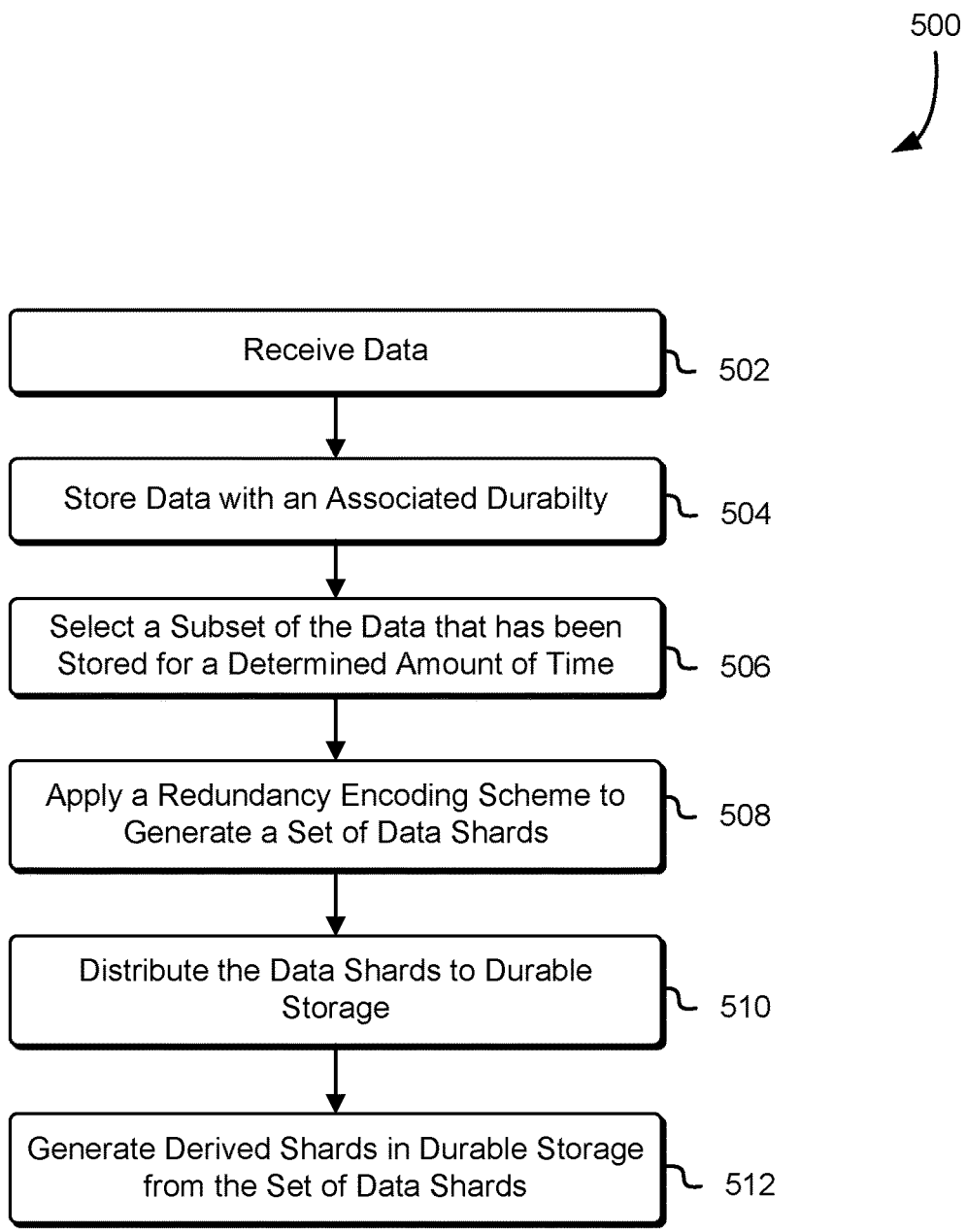
FIG. 5 illustrates an example process for making data stored in preliminary storage eventually durable in accordance with at least one embodiment.

FIG. 5 illustrates an example process 500 for making data stored in preliminary storage eventually durable as described in connection with FIG. 1 and in accordance with an embodiment. A data storage service such as the data storage service 112 described in connection with FIG. 1 may perform the example process 500 illustrated in FIG. 5. First, a data storage service may receive one or more data objects 502, which may be received over an interval of time. For example, the one or more data objects 502 may be received as they are created by a service of a computing resource service provider as described herein. The data storage service may then store 504 the one or more data objects and may also store each of the data objects with an associated durability. In an embodiment, the durability of each of the data objects is expressed as a measure of the reliability desired for the data object such as, for example, greater than 99.99 percent reliability (e.g., four 9's) or greater than 99.999 percent reliability (e.g., five 9's).

The data storage service may then select 506 a subset of the set of data objects that have been stored for at least a predetermined amount of time where the predetermined amount of time may be based on the durability of the data objects, or may be based on the volatility of the data objects, or may be based on some other criteria. The data storage service may then apply 508 a redundancy encoding scheme to the selected subset of the set of data objects to generate a set of data shards, may distribute 510 the data shards to durable data storage devices, and may generate 512 one or more derived shards in durable storage based on the set of data shards, all as described herein.

Figure 6:
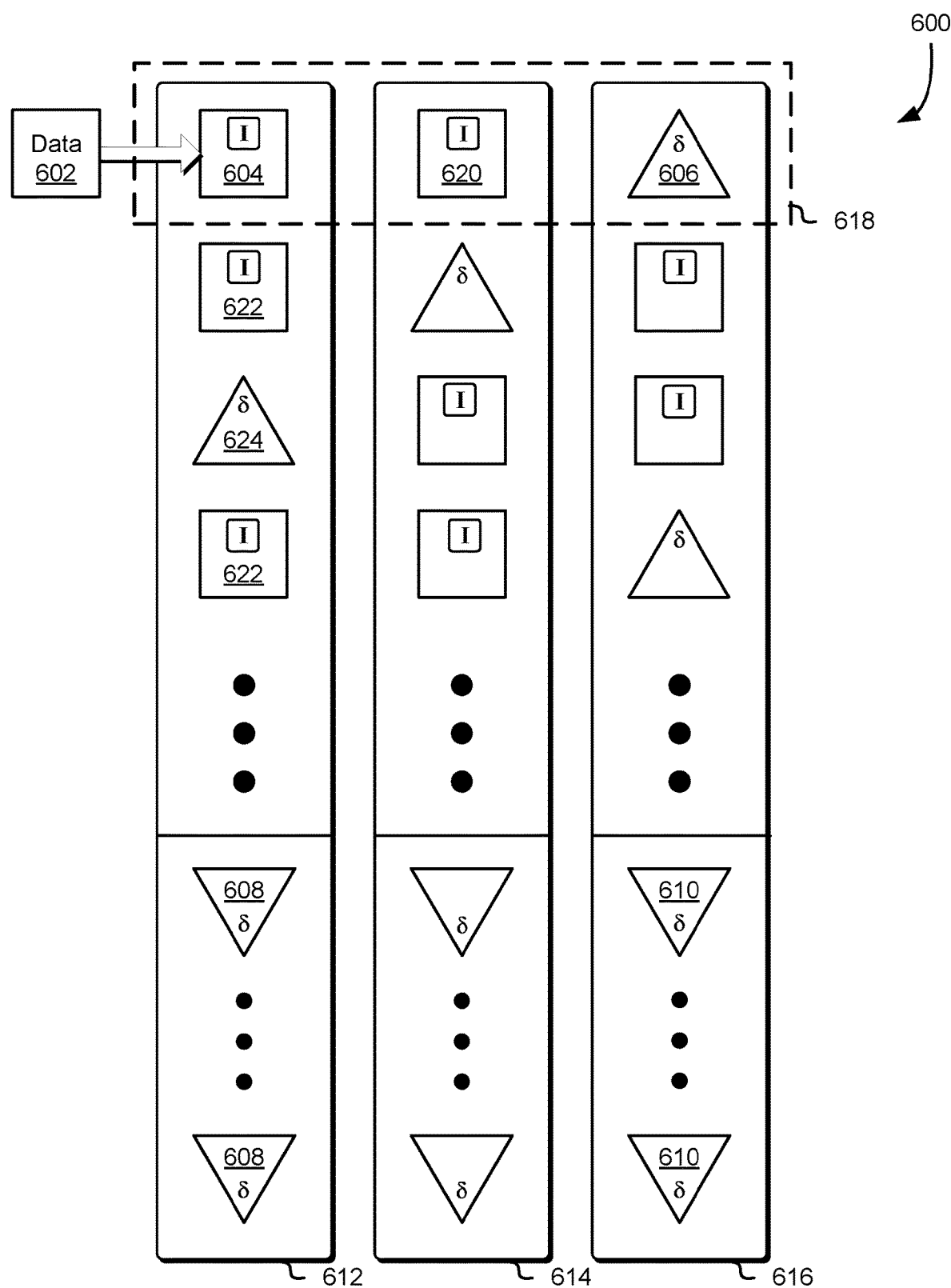
FIG. 6 illustrates an example environment where a redundancy encoding technique is applied to data stored in durable storage in accordance with at least one embodiment.

FIG. 6 illustrates an example environment 600 where a redundancy encoding technique is applied to data stored in durable storage as described in connection with FIG. 1 and in accordance with an embodiment. The redundancy encoding technique illustrated in FIG. 6 is an example of a grid encoding technique wherein each identity shard is part of a first set of one or more identity shards which may be bundled with one or more derived shards in a first group or bundle (i.e., in one dimension or direction) and each identity shard is also part of at least a second set of one or more identity shards which may be bundled with one or more other derived shards in a second bundle or group (i.e., in a second dimension or direction). As is illustrated in FIG. 6, a grid encoding technique is often implemented as a two-dimensional grid, with each shard being part of two bundles (i.e., both "horizontal" and "vertical" bundles). However, a grid encoding technique may also be implemented as a three-dimensional grid, with each shard being part of three bundles, or a four-dimensional grid, with each shard being part of four bundles, or as a larger-dimensional grid. Additional details of grid encoding techniques are described in U.S. patent application Ser. No. 14/789,783, filed Jul. 1, 2015, entitled "GRID ENCODED DATA STORAGE SYSTEMS FOR EFFICIENT DATA REPAIR," which is incorporated by reference herein.

In the example illustrated in FIG. 6, data 602 from preliminary storage is provided for storage in durable storage using a redundancy encoding technique with both horizontal derived shards and vertical derived shards. In the example illustrated in FIG. 6, a first datacenter 612 may contain data shards (denoted as a square shard with the letter "I"), horizontal derived shards (denoted as a triangular shard with the Greek letter "δ" or delta), and vertical derived shards (denoted as an inverted triangle with the Greek letter "δ") all of which may be stored on durable storage volumes within the first datacenter 612. A second datacenter 614, which may be geographically and/or logically separate from the first datacenter 612, may also contain data shards, horizontal derived shards, and/or vertical derived shards. A third datacenter 616, which may be geographically and/or logically separate from the first datacenter 612 and from the second datacenter 614, may also contain data shards, horizontal derived shards, and/or vertical derived shards. As illustrated in FIG. 6, each of the three datacenters may be a single vertical bundle. In an embodiment, each of the datacenters can include multiple vertical bundles. As may be contemplated, the number of datacenters illustrated in FIG. 6 and/or the composition of the datacenters illustrated in FIG. 6 are merely illustrative examples and other numbers and/or compositions of datacenters may be considered as within the scope of the present disclosure. The datacenters may be co-located or may be located in one or more separate datacenter locations.

In the example illustrated in FIG. 6, the data 602 may be copied to a data shard 604 and, as a result of the change to the data in the data shard 604, a horizontal derived shard 606 associated with the data shard 604 may be updated so that the horizontal derived shard 606 may be used to reconstruct the data shard 604 in the event of a loss of the data shard 604. In the example illustrated in FIG. 6, the three shards enclosed by the dotted line (e.g., the data shard 604, the data shard 620, and the horizontal derived shard 606) are a horizontal bundle 618. In this example, the data shard 620 is not affected by the changes to the data shard 604 but the horizontal derived shard 606 may need to be updated as a result of the changes to the data shard 604.

Also as a result of the change to the data in the data shard 604, one or more vertical derived shards 608 related to the data shard 604 may also be updated so that the vertical derived shards 608 may be used to reconstruct the data shard 604 in the event of a loss of the data shard 604 and the horizontal derived shard 606. In the example illustrated in FIG. 6, the shards in datacenter 612 form a vertical bundle. In this example, the other data shards 622 in the vertical bundle and/or the horizontal derived shards 624 in the vertical bundle are not affected by the changes to the data shard 604 but the vertical derived shards 608 may need to be updated as a result of the changes to the data shard 604. Finally, as a result of the change to the horizontal derived shard 606, one or more vertical derived shards 610 related to the horizontal derived shard 606 in the vertical bundle in datacenter 616 may also be updated so that the vertical derived shards 610 may be used to reconstruct the horizontal derived shard 606 in the event of a loss of the horizontal derived shard 606 and the data shard 604.

Figure 7:
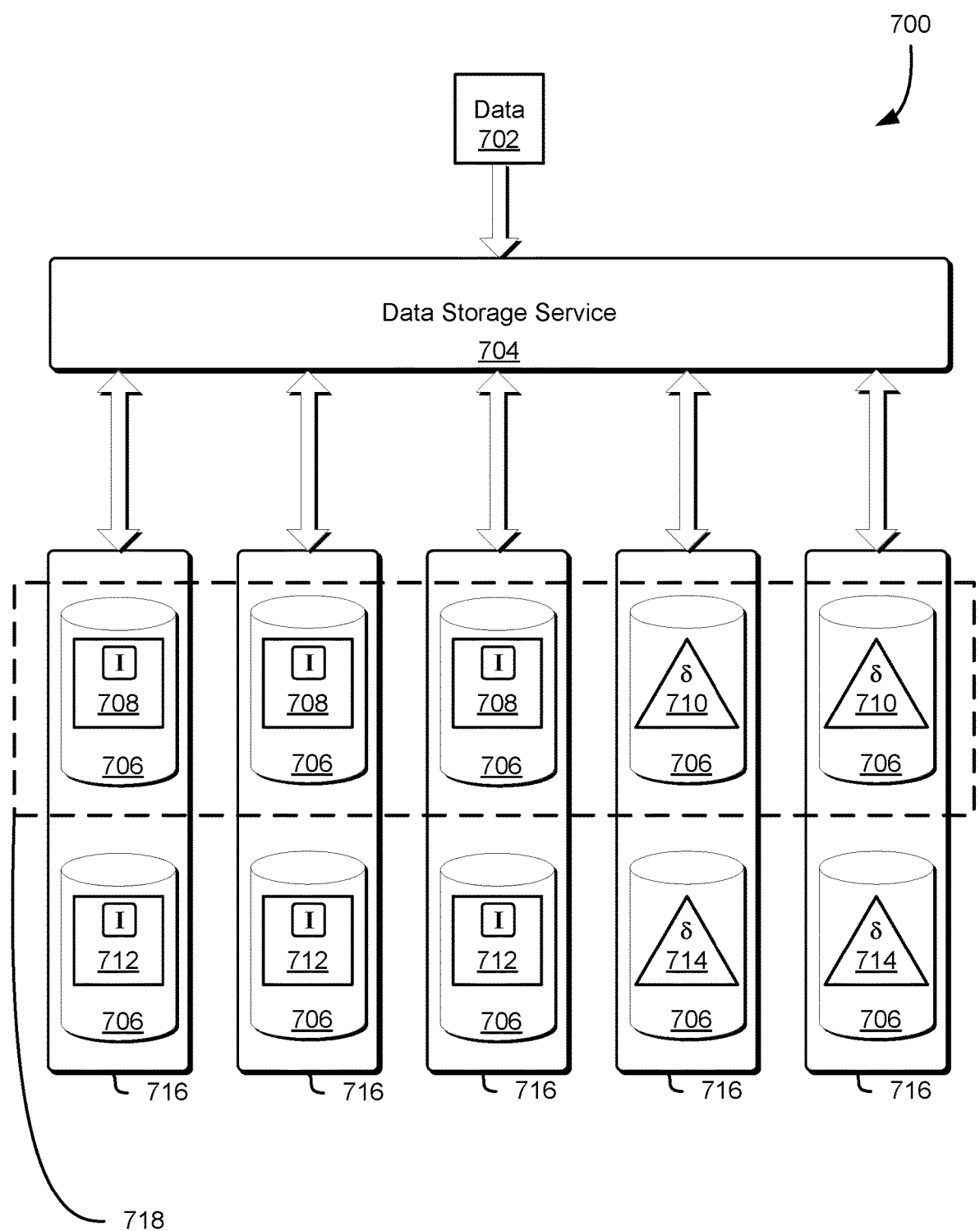
FIG. 7 illustrates an example environment where a redundancy encoding technique is applied to data stored in durable storage in accordance with at least one embodiment.

FIG. 7 illustrates an example environment 700 where a redundancy encoding technique is applied to data stored in durable storage as described in connection with FIG. 1 and in accordance with at least one embodiment. The redundancy encoding technique illustrated in FIG. 7 is an example of a bundle encoding technique wherein one or more identity shards (also referred to herein as "data shards") may be bundled with one or more derived shards in a single group or dimension. Additional details of bundle encoding techniques are described in U.S. patent application Ser. No. 14/741,409, filed Jun. 16, 2015, entitled "ADAPTIVE DATA LOSS MITIGATION FOR REDUNDANCY CODING SYSTEMS," which is incorporated by reference herein.

Data 702 from preliminary storage may be sent to a data storage system 704 for redundant storage. The data 702 may be provided from the preliminary storage by any entity capable of transacting data with a data storage system, such as over a network (including the Internet). Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data storage system 704 via application programming interface calls, web service calls, or other programmatic methods), and the like.

The data storage system 704 may be any computing resource or collection of such resources capable of processing data for storage, and interfacing with one or more resources to cause the storage of the processed data. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data storage system 704 via application programming interface calls, web service calls, or other programmatic methods), and the like. In some embodiments, the resources of the data storage system 704, as well as the data storage system 704 itself, may be one or more resources of a computing resource service provider, such as that described in further detail below. In some embodiments, the data storage system 704 and/or the computing resource service provider provides one or more archival storage services and/or data storage services, such as those described herein, through which a client entity may provide data such as the data 702 for storage in preliminary storage and/or the data storage system 704.

Data 702 may include any quantity of data in any format. For example, the data 702 may be a single file or may include several files. The data 702 may also be encrypted by, for example, a component of the data storage system 704 after the receipt of the data 702 in response to a request made by a customer of the data storage system 704 and/or by a customer of computing resource service provider.

The data storage system 704 may sort one or more identity shards according to one or more criteria (and in the case where a plurality of criteria is used for the sort, such criteria may be sorted against sequentially and in any order appropriate for the implementation). Such criteria may be attributes common to some or all of the archives, and may include the identity of the customer, the time of upload and/or receipt (by the data storage system 704), archive size, expected volume and/or shard boundaries relative to the boundaries of the archives (e.g., so as to minimize the number of archives breaking across shards and/or volumes), and the like. As mentioned, such sorting may be performed so as to minimize the number of volumes on which any given archive is stored. Such techniques may be used, for example, to optimize storage in embodiments where the overhead of retrieving data from multiple volumes is greater than the benefit of parallelizing the retrieval from the multiple volumes. Information regarding the sort order may be persisted, for example, by the data storage system 704, for use in techniques described in further detail herein.

As previously discussed, in some embodiments, one or more indices may be generated in connection with, for example, the order in which the archives are to be stored, as determined in connection with the sorting mentioned immediately above. The index may be a single index or may be a multipart index, and may be of any appropriate architecture and may be generated according to any appropriate method. For example, the index may be a bitmap index, dense index, sparse index, or a reverse index. Embodiments where multiple indices are used may implement different types of indices according to the properties of the identity shard to be stored via the data storage system 704. For example, a data storage system 704 may generate a dense index for archives over a specified size (as the size of the index itself may be small relative to the number of archives stored on a given volume), and may also generate a sparse index for archives under that specified size (as the ratio of index size to archive size increases).

The data storage system 704 is connected to or includes one or more volumes 706 on which archives or identity shards may be stored. The generated indices for the archives may also be stored on the one or more volumes 706. The volumes 706 may be any container, whether logical or physical, capable of storing or addressing data stored therein. In some embodiments, the volumes 706 may map on a one-to-one basis with the data storage devices on which they reside (and, in some embodiments, may actually be the data storage devices themselves). In some embodiments, the size and/or quantity of the volumes 706 may be independent of the capacity of the data storage devices on which they reside (e.g., a set of volumes may each be of a fixed size such that a second set of volumes may reside on the same data storage devices as the first set). The data storage devices may include any resource or collection of resources, such as those of a computing resource service provider, that are capable of storing data, and may be physical, virtual, or some combination of the two.

As previously described, one or more indices may, in some embodiments, be generated for each volume of the plurality of volumes 706, and in such embodiments, may reflect the archives stored on the respective volume to which it applies. In embodiments where sparse indices are used, a sparse index for a given volume may point to a subset of archives stored or to be stored on that volume, such as those archives which may be determined to be stored on the volume based on the sort techniques mentioned previously. The subset of volumes to be indexed in the sparse index may be selected on any appropriate basis and for any appropriate interval. For example, the sparse index may identify the archives to be located at every x blocks or bytes of the volume (e.g., independently of the boundaries and/or quantity of the archives themselves). As another example, the sparse index may identify every nth archive to be stored on the volume. As may be contemplated, the indices (whether sparse or otherwise), may be determined prior to actually storing the archives on the respective volumes. In some embodiments, a space may be reserved on the volumes so as to generate and/or write the appropriate indices after the archives have been written to the volumes 706.

In some embodiments, the sparse indices are used in connection with information relating to the sort order of the archives so as to locate archives without necessitating the use of dense indices, for example, those that account for every archive on a given volume. Such sort order-related information may reside on the volumes 706 or, in some embodiments, on an entity separate from the volumes 706, such as in a data store or other resource of a computing resource service provider. Similarly, the indices may be stored on the same volumes 706 to which they apply, or, in some embodiments, separately from such volumes 706.

The archives may be stored, bit for bit (e.g., the "original data" of the archives), on a subset of the plurality of volumes 706. Also as mentioned, appropriate indices may also be stored on the applicable subset of the plurality of volumes 706. The original data of the archives is stored as a plurality of shards across a plurality of volumes, the quantity of which (either shards or volumes, which in some cases may have a one to one relationship) may be predetermined according to various factors, including the number of total shards that may be used to reconstruct the original data using a redundancy encode. In some embodiments, the number of volumes used to store the original data of the archives is the quantity of shards that may be used to reconstruct the original data from a plurality of shards generated by a redundancy code from the original data. As an example, FIG. 7 illustrates five volumes, three of which contain original data archives 708 and two of which contain derived data 710, such as redundancy encoded data. In the illustrated example, the redundancy code used may require any three shards to regenerate original data, and therefore, a quantity of three volumes may be used to write the original data (even prior to any application of the redundancy code).

The volumes 706 bearing the original data archives 708 may each contain or be considered as shards unto themselves. For example, the data 702 from preliminary storage may be copied directly only to a volume if, as described herein, it is stored in preliminary storage as an identity shard. In embodiments where the sort order-related information and/or the indices are stored on the applicable volumes 706, they may be included with the original data of the archives and stored therewith as shards, as previously mentioned. In the illustrated example, the original data archives 708 are stored as three shards (which may include the respective indices) on three associated volumes 706. In some embodiments, the original data archives 708 (and, in embodiments where the indices are stored on the volumes, the indices) are processed by an entity associated with, for example, the archival storage service, using a redundancy code, such as an erasure code, so as to generate the remaining shards, which contain encoded information rather than the original data of the original data archives. The original data archives 708 may be processed using the redundancy code at any time after being sorted, such as prior to being stored on the volumes, contemporaneously with such storage, or after such storage.

Such encoded information may be any mathematically computed information derived from the original data, and depends on the specific redundancy code applied. As mentioned, the redundancy code may include erasure codes (such as online codes, Luby transform codes, raptor codes, parity codes, Reed-Solomon codes, Cauchy codes, Erasure Resilient Systematic Codes, regenerating codes, or maximum distance separable codes) or other forward error correction codes. In some embodiments, the redundancy code may implement a generator matrix that implements mathematical functions to generate multiple encoded objects correlated with the original data to which the redundancy code is applied. In some of such embodiments, an identity matrix is used, wherein no mathematical functions are applied and the original data (and, if applicable, the indices) are allowed to pass straight through. In such embodiments, it may be therefore contemplated that the volumes bearing the original data (and the indices) may correspond to objects encoded from that original data by the identity matrix rows of the generator matrix of the applied redundancy code, while volumes bearing derived data correspond to other rows of the generator matrix. In the example illustrated in FIG. 7, the five volumes 706 include three volumes that have shards (e.g., identity shards) corresponding to the original data of the original data archives 708, while two have encoded shards corresponding to the derived data 710 (also referred to herein as "derived shards"). As illustrated in FIG. 7, the three original data archives 708, and the two encoded shards corresponding to the derived data 710 form a bundle 718 (denoted by the dashed line). In this example, the applied redundancy code may result in the data being stored in a "3:5" scheme, wherein any three shards of the five stored shards are required to regenerate the original data, regardless of whether the selected three shards contain the original data or the derived data.

In some embodiments, if one of the volumes 706 or a shard stored thereon is detected as corrupt, missing, or otherwise unavailable, a new shard may be generated using the redundancy code applied to generate the shard(s) in the first instance. The new shard may be stored on the same volume or a different volume, depending, for example, on whether the shard is unavailable for a reason other than the failure of the volume. The new shard may be generated by, for example, the data storage system 704, by using a quantity of the remaining shards that may be used to regenerate the original data (and the index, if applicable) stored across all volumes, regenerating that original data, and either replacing the portion of the original data corresponding to that which was unavailable (in the case that the unavailable shard contains original data), or reapplying the redundancy code so as to provide derived data for the new shard.

As previously discussed, in some embodiments, the new shard may be a replication of the unavailable shard, such as may be the case if the unavailable shard includes original data of the archive(s). In some embodiments, the new shard may be selected from a set of potential shards as generated by, for example, a generator matrix associated with the redundancy code, so as to differ in content from the unavailable shard (such as may be the case if the unavailable shard was a shard generated from the redundancy code, and therefore contains no original data of the archives). As discussed throughout this disclosure, the shards and/or volumes may be grouped and/or layered.

In some embodiments, retrieval of an archive stored in accordance with the techniques described herein may be requested by a client entity under control of a customer of the computing resource service provider and/or the archival storage service provided therefrom, as described in further detail throughout this disclosure. In response to the request, the data storage system 704 may locate, based on information regarding the sort order of the archives as stored on the volumes 706, the specific volume on which the archive is located. Thereafter, the index or indices may be used to locate the specific archive, whereupon it may be read from the volume and provided to a requesting client entity. In embodiments where sparse indices are employed, the sort order information may be used to locate the nearest location (or archive) that is sequentially prior to the requested archive, whereupon the volume is sequentially read from that location or archive until the requested archive is found. In embodiments where multiple types of indices are employed, the data storage system 704 may initially determine which of the indices includes the most efficient location information for the requested archive based on assessing the criteria used to deploy the multiple types of indices in the first instance. For example, if archives under a specific size are indexed in a sparse index and archives equal to or over that size are indexed in a parallel dense index, the data storage system 704 may first determine the size of the requested archive, and if the requested archive is larger than or equal to the aforementioned size boundary, the dense index may be used so as to more quickly obtain the precise location of the requested archive.

In some embodiments, the volumes 706 may be grouped such that each given volume has one or more cohorts 716. In such embodiments, a volume set (e.g., all of the illustrated volumes 706) may be implemented such that incoming archives to be stored on the volumes are apportioned to one or more failure-decorrelated subsets of the volume set. The failure-decorrelated subsets may be some combination of the volumes 706 of the volume subset, where the quantity of volumes correlates to a number of shards required for the implemented redundancy code. In the illustrated example, the overall volume set may comprise two failure-decorrelated subsets (volumes in a horizontal row) where a given constituent volume is paired with a cohort (e.g., the cohort 716). In some embodiments, the incoming archives are apportioned to one or more of the cohorts in the failure-decorrelated subset according to, for example, a predetermined sequence, based on one or more attributes of the incoming archives, and the like.

The illustrated example shows, for clarity, a pair-wise cohort scheme, though other schemes are contemplated as within scope of this disclosure, some of which are outlined in greater detail herein. In the illustrated example, some of the volumes of the volume set store original data of incoming archives (e.g., original data archives 708 and/or original data archives 712), while others store derived data (e.g., derived data 710 and derived data 714). The data storage system 704 may implement a number of failure-decorrelated subsets to which to store the incoming archives, and in the pair-wise scheme pictured, the volumes used for a given archive may differ based on some arbitrary or predetermined pattern. As illustrated, some archives may be apportioned to volumes of a given cohort that are assigned to one pattern, or failure-decorrelated subset as shown by original data archives 708 and derived data 710, while others are apportioned to volumes in a different pattern as shown by original data archives 712 and derived data 714. The patterns, as mentioned, may be arbitrary, predefined, and/or in some cases, sensitive to attributes of the incoming data. In some embodiments, patterns may not be used at all, and the member volumes of a given failure-decorrelated subset may be selected randomly from a pool of volumes in the volume set.

Figure 8:
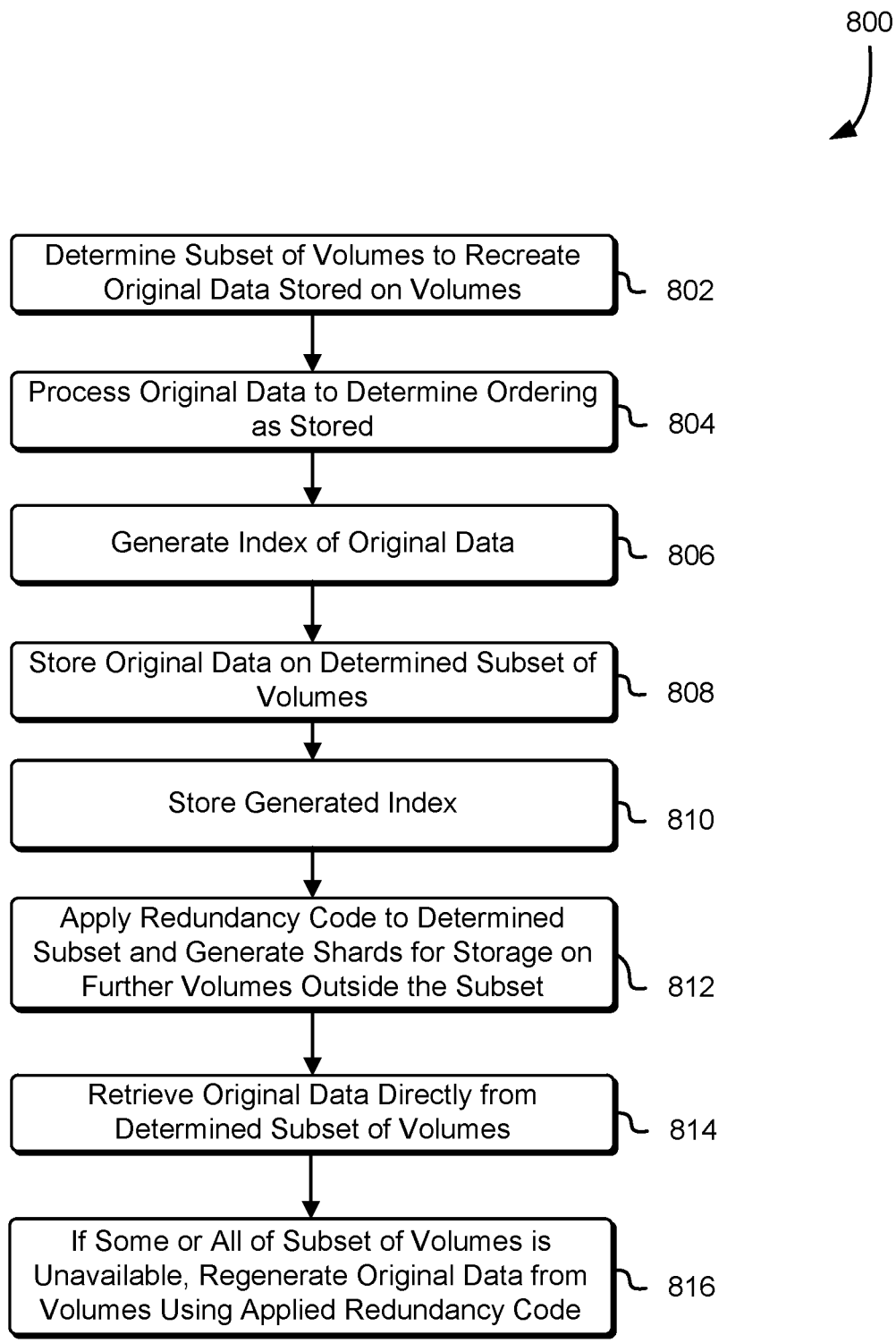
FIG. 8 illustrates an example process for applying redundancy encoding techniques to data stored in durable storage in accordance with at least one embodiment.

FIG. 8 illustrates an example process 800 for applying redundancy encoding techniques to data stored in durable storage as described herein in connection with FIG. 1 and in accordance with at least one embodiment. The example process 800 illustrated in FIG. 8 illustrates the processing, indexing, storing, and retrieving of data stored on a data storage system. The data may be retrieved from preliminary storage as described herein. The example process 800 illustrated in FIG. 8 may be used in conjunction with a grid encoding technique such that described in connection with FIG. 6, in conjunction with a bundle encoding technique such as that described in connection with FIG. 7, or with some other redundancy encoding technique. A data storage service such as the data storage service 112 described in connection with FIG. 1 may perform the example process 800 illustrated in FIG. 8.

At step 802, a resource of a data storage system, such as that implementing a redundancy code to store archives, determines which subset (e.g., quantity) of a plurality of volumes that may be used to recreate the original data to be stored, based on, for example, a redundancy code to be applied to the archives. For example, in accordance with the techniques described above in connection with FIG. 7, such information may be derived from predetermining the parameters of an erasure code with a specified ratio of shards that may be used to regenerate the original data from which they derive to the total number of shards generated from the application of the erasure code.

At step 804, original data, such as original data of archives received from customers of, for example, a data storage system or a computing resource service provider as described in further detail herein, is sorted by, for example, the data storage system or associated entity. For example, the sort order may be implemented on one or more attributes of the incoming data.

At step 806, one or more indices, such as sparse indices, are generated by, for example, the data storage system, for the original data. For example, there may be more than one index for a given volume, and such parallel indices may be of different types depending on the nature of the archives and/or original data being stored.

At step 808, the original data is stored, for example, by the data storage system, on the subset of volumes determined in connection with step 802, and in the order determined in step 804. Additionally, at step 810, the index generated in step 806 is stored, for example, by the data storage system, on an appropriate entity. For example, the index may be stored as part of a shard on which the original data is stored, or, in some embodiments, may be stored on a separate resource from that which persists the volume.

At step 812, the redundancy code is applied, for example, by the data storage system, to the determined subset of volumes (e.g., shards, as previously described herein), and additional shards containing data derived from the application of the redundancy code are stored on a predetermined quantity of volumes outside the subset determined in connection with step 802. For example, the ratio of volumes (e.g., shards as previously described herein) storing the original data to the overall quantity of volumes (including those storing the derived data generated in this step 812) may be prescribed by the recovery/encoding ratio of the redundancy code applied herein.

At step 814, in normal operation, requested data may be retrieved, for example, by the data storage system, directly from the subset of volumes storing the original data, without necessitating retrieval and further processing (e.g., by the redundancy code) from the volumes storing the derived data generated in step 812. However, at step 816, if any of the volumes are determined, for example, by the data storage system, to be unavailable, a replacement shard may be generated by the data storage system by reconstructing the original data from a quorum of the remaining shards, and re-encoding using the redundancy code to generate the replacement shard. The replacement shard may be the same or may be different from the shard detected as unavailable.

Figure 9:
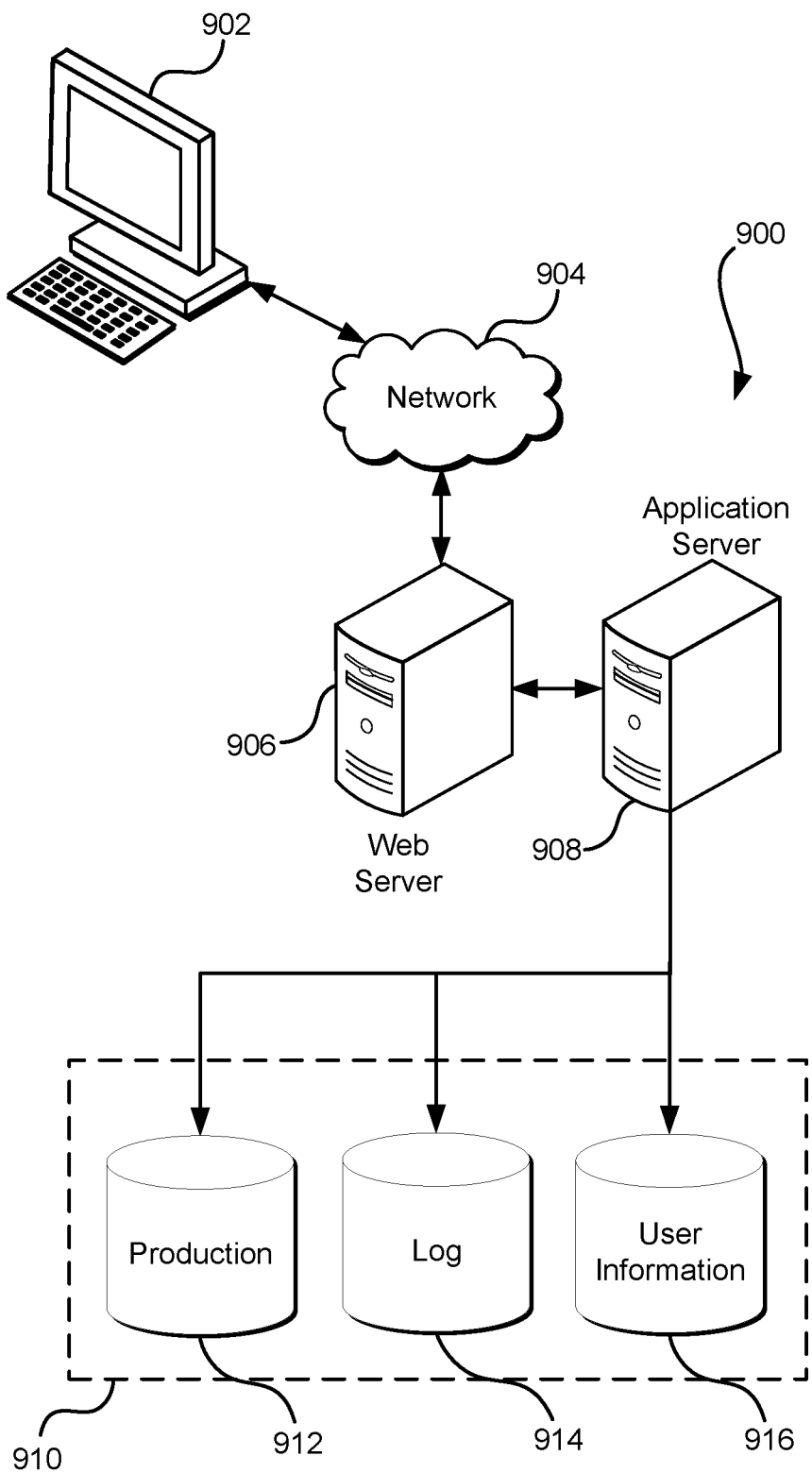
FIG. 9 illustrates an example environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device such as the user device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system in the example environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   identifying a rate of change of a data object, the data object being associated with a first plurality of redundancy encoded shards generated to provide the data object with a first durability;
   determining that the rate of change is below a predetermined threshold value;
   as a result of the rate of change being below the predetermined threshold value, generating, based on the data object and a redundancy encoding scheme, a second plurality of redundancy encoded shards to provide the data object with a second durability greater than the first durability; and
   storing the second plurality of redundancy encoded shards.

2. The computer-implemented method of claim 1, wherein the redundancy encoding technique is a bundle encoding technique.

3. The computer-implemented method of claim 1, wherein the redundancy encoding technique is a grid encoding technique.

4. The computer-implemented method of claim 1, further comprising storing the first plurality of redundancy encoded shards in a preliminary storage.

5. The computer-implemented method of claim 4, further comprising delaying the generating of the second plurality of redundancy encoded shards for a period of time after the storing of the first plurality of redundancy encoded shards.

6. A system, comprising at least one computing device that implements one or more services to:
   monitor a rate of change of a data object, the data object having a first durability as a result of being associated with a first redundancy encoding scheme;
   determine that the rate of change is below a predetermined threshold value;
   as a result of the rate of change being below the predetermined threshold value, generate, based on the data object and a second redundancy encoding scheme, a second plurality of redundancy encoded shards to provide the data object with a second durability different than the first durability; and
   store the second plurality of redundancy encoded shards.

7. The system of claim 6, wherein the services further determine a length of time to delay generating the second plurality of redundancy encoded shards.

8. The system of claim 7, wherein the length of time is based at least in part on the rate of change of the data object.

9. The system of claim 6, wherein the rate of change of the data object corresponds to a number of changes made to the data object while stored in a preliminary storage associated with the system.

10. The system of claim 6, wherein the services further obtain the data object in connection with processing a storage request for the data object.

11. The system of claim 10, wherein the storage request is received via a programmatic interface associated with the one or more services.

12. The system of claim 10, wherein the second durability is defined in the storage request.

13. The system of claim 6, wherein the first redundancy encoding scheme is implemented by a preliminary storage on which the data object is initially stored.

14. The system of claim 6, wherein the second durability is greater than the first durability.

15. A non-transitory computer-readable storage medium having stored thereon executable instructions that, as a result of execution by one or more processors of a computer system, cause the computer system to at least:
  determine that a rate of change of a data object is below a predetermined threshold value, the data object having a first durability as a result of being associated with a first redundancy encoding scheme;
  as a result of the rate of change of the data object being below the predetermined threshold value, generate, based on the data object and a second redundancy encoding scheme, a second plurality of redundancy encoded shards to provide the data object with a second durability different than the first durability; and
  store the second plurality of redundancy encoded shards.

16. The non-transitory computer-readable storage medium of claim 15, wherein the instructions, as a result of execution, further cause the computer system to monitor the rate of change of the data object for a period of time.

17. The non-transitory computer-readable storage medium of claim 15, wherein the first redundancy encoding scheme is implemented by a data storage device.

18. The non-transitory computer-readable storage medium of claim 17, wherein the data storage device is a magnetic storage device.

19. The non-transitory computer-readable storage medium of claim 15, wherein the first redundancy encoding scheme comprises storing the data object on two different systems.

20. The non-transitory computer-readable storage medium of claim 15, wherein the rate of change of the data object is associated with a length of time elapsed after the data object is initially stored.

* * * * *